(12) United States Patent
Tokuda

(10) Patent No.: US 8,269,994 B2
(45) Date of Patent: Sep. 18, 2012

(54) INFORMATION PROCESSING APPARATUS AND CONTROL METHOD THEREOF, AND COMPUTER-READABLE STORAGE MEDIUM

(75) Inventor: Akihiko Tokuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 12/399,658

(22) Filed: Mar. 6, 2009

(65) Prior Publication Data

US 2009/0225346 A1 Sep. 10, 2009

(30) Foreign Application Priority Data

Mar. 7, 2008 (JP) .................................. 2008-057665

(51) Int. Cl.
*G06F 3/12* (2006.01)
*H04N 1/32* (2006.01)
*H04N 1/40* (2006.01)

(52) U.S. Cl. ...................... 358/1.13; 358/448; 358/468

(58) Field of Classification Search .................. 358/448, 358/474, 400, 1.15, 444, 1.18, 1.16, 1.13, 358/468

See application file for complete search history.

(56) References Cited

U.S. PATENT DOCUMENTS

| | | | | |
|---|---|---|---|---|
| 5,535,312 A | * | 7/1996 | Hammer et al. | 358/1.16 |
| 6,661,530 B1 | * | 12/2003 | Munetomo et al. | 358/1.15 |
| 7,467,237 B2 | | 12/2008 | Kurabayashi | |
| 7,952,730 B2 | * | 5/2011 | Sakura | 358/1.13 |
| 2005/0165979 A1 | * | 7/2005 | Kato | 710/15 |
| 2006/0170947 A1 | | 8/2006 | Kurabayashi | |
| 2007/0296995 A1 | * | 12/2007 | Sakura | 358/1.13 |
| 2007/0299989 A1 | * | 12/2007 | Maruyama | 710/5 |
| 2008/0007741 A1 | * | 1/2008 | Shinchi et al. | 358/1.1 |
| 2008/0100860 A1 | * | 5/2008 | Yamada | 358/1.13 |
| 2008/0180741 A1 | * | 7/2008 | Miyata | 358/1.15 |
| 2008/0239373 A1 | * | 10/2008 | Suzuki | 358/1.15 |

FOREIGN PATENT DOCUMENTS

| | | | |
|---|---|---|---|
| JP | 2005301613 | * | 10/2005 |
| JP | 2006-209292 A | | 8/2006 |
| JP | 2006285476 | * | 10/2006 |

\* cited by examiner

*Primary Examiner* — Jerome Grant, II

(74) *Attorney, Agent, or Firm* — Canon U.S.A., Inc. IP Division

(57) ABSTRACT

An information processing apparatus that customizes a printer driver includes a reading unit configured to read a printer driver set for installing the printer driver, a setting unit configured to set limitation information that imposes a limit on setting information which is set when the printer driver included in the printer driver set read by the reading unit is installed into a computer, and a storage unit configured to store the limitation information in the printer driver set so that the limitation information can be registered in the computer in a state where the printer driver can be identified to be a customized printer driver having a setting of the limitation information when the printer driver included in the printer driver set is installed in the computer.

10 Claims, 20 Drawing Sheets

FIG.3
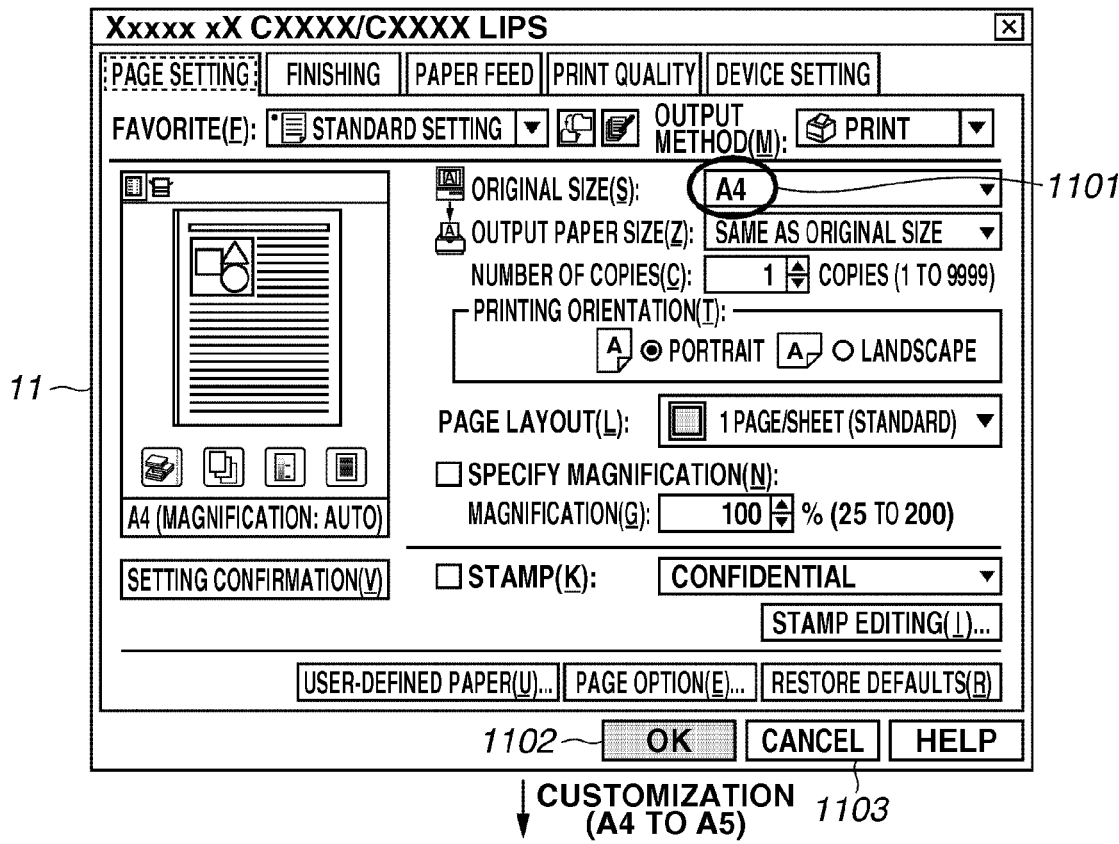
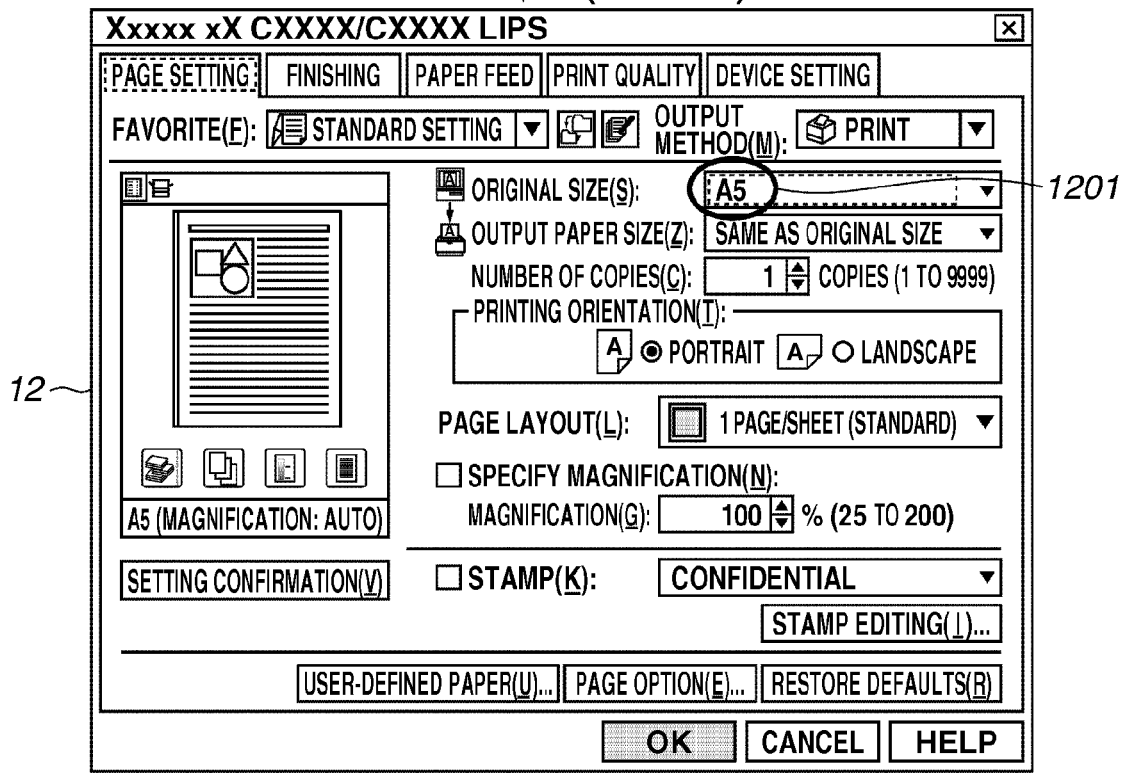

FIG.5

Xxxxx xX CXXXX/CXXXX LIPS

| PAGE SETTING | FINISHING | PAPER FEED | PRINT QUALITY | DEVICE SETTING |

ACQUIRING DEVICE INFORMATION: MANUAL

14

PAPER FEED OPTION: ☐ DOUBLE CASSETTE PEDESTAL(C)
☐ SIDE PAPER DECK(K)

PAPER DISCHARGE OPTION(O): NONE ▼
TRAY C SETTING(Y): FINISHER UPPER TRAY ▼
PUNCHER UNIT(R): NONE ▼

☐ DEVICE COPY-FORGERY-INHIBITED PATTERN PRINTING FUNCTION (V)

INTERNAL SPOOL PROCESSING(P): AUTO ▼

☐ USE A DIVISION CONTROL FUNCTION(J) [SETTING(I)...]
☐ SET A USER NAME(L) [SETTING(W)...]

1401

[SPECIAL(S)...] [DEVICE FUNCTION(U)...] [FONT SETTING(F)...] [ASSIGN PAPER AND A METHOD OF FEEDING PAPER(T)...]

[ACQUIRE RESOURCE INFORMATION(N)...] [ACQUIRE DEVICE INFORMATION(G)...] [VERSION INFORMATION(B)]

[OK] [CANCEL] [HELP]

---

SPECIAL SETTING

☐ TURN ON SPECIAL SETTING(O)

15

[OK] [CANCEL] [RESTORE DEFAULTS(R)] [HELP(H)]

| SETTING VALUE FOR A'S PRINTER DRIVER (NON-CUSTOMIZED) ||
|---|---|
| PAPER SIZE | A4 |
| PAGE LAYOUT | 1 PAGE/SHEET (OVERALL FACE) |
| PRINTING METHOD | ONE-SIDED |
| COLOR MODE | COLOR |
| . . . | . . . |

*63*

| SETTING VALUE OF B'S PRINTER DRIVER (CUSTOMIZED) ||
|---|---|
| PAPER SIZE | A4 |
| PAGE LAYOUT | 2 PAGES/SHEETS |
| PRINTING METHOD | TWO-SIDED |
| COLOR MODE | MONOCHROME |
| . . . | . . . |

*64*

| PAGE LAYOUT | 2 PAGES/SHEETS (FIXED) |
|---|---|
| PRINTING METHOD | TWO-SIDED (FIXED) |
| COLOR MODE | MONOCHROME (FIXED) |

*65*

| CUSTOMIZATION FLAG | ON |
|---|---|

FIG.18

MEMORY MEDIUM SUCH AS FD/CD-ROM

| DIRECTORY INFORMATION |
|---|
| PROGRAM CODE CORRESPONDING TO STEPS OF FLOWCHART ILLUSTRATED IN FIG. 9 |
| PROGRAM CODE CORRESPONDING TO STEPS OF FLOWCHART ILLUSTRATED IN FIG. 10 |
| PROGRAM CODE CORRESPONDING TO STEPS OF FLOWCHART ILLUSTRATED IN FIG. 11 |
| PROGRAM CODE CORRESPONDING TO STEPS OF FLOWCHART ILLUSTRATED IN FIG. 12 |
| PROGRAM CODE CORRESPONDING TO STEPS OF FLOWCHART ILLUSTRATED IN FIG. 15 |
| PROGRAM CODE CORRESPONDING TO STEPS OF FLOWCHART ILLUSTRATED IN FIG. 16 |

| SETTING VALUE FOR A'S PRINTER DRIVER (NON-CUSTOMIZED) ||
|---|---|
| PAPER SIZE | A4 |
| PAGE LAYOUT | 1 PAGE/SHEET (OVERALL FACE) |
| PRINTING METHOD | ONE-SIDED |
| COLOR MODE | COLOR |
| . . . | . . . |

33

| SETTING VALUE OF B'S PRINTER DRIVER (CUSTOMIZED) ||
|---|---|
| PAPER SIZE | A4 |
| PAGE LAYOUT | 2 PAGES/SHEETS |
| PRINTING METHOD | TWO-SIDED |
| COLOR MODE | MONOCHROME (FIXED) |
| . . . | . . . |

INFORMATION PROCESSING APPARATUS AND CONTROL METHOD THEREOF, AND COMPUTER-READABLE STORAGE MEDIUM

BACKGROUND OF THE INVENTION

1. Field of the Invention

The present invention relates to customization of a printer driver.

2. Description of the Related Art

A printer driver is installed in a host computer to generate print data. Since various users use the printer driver, it is desired that a printer driver that corresponds with individual needs and is provided with various kinds of setting values is in the market.

In response to such a desire, a tool (customization tool) for changing a setting value of a printer driver is created.

For example, the conventional customization tool can change an initial setting value of the printer driver to another value. For example, an initial value of an "original size" can be changed from "A4" to "A5".

Further, the customization tool can fix the initial value to a specified value. For example, a user who installs the printer driver fixes a paper size to "A4", a page layout to "2 pages/sheet", a print method to "two-sided", and a color mode to "monochrome" so that the setting values can not be changed.

SUMMARY OF THE INVENTION

According to an aspect of the present invention, an information processing apparatus that customizes a printer driver includes a reading unit configured to read a printer driver set for installing the printer driver, a setting unit configured to set limitation information that imposes a limit on setting information which is set when the printer driver included in the printer driver set read by the reading unit is installed into a computer, and a storage unit configured to store the limitation information in the printer driver set so that the limitation information can be registered in the computer in a state where the printer driver can be identified to be a customized printer driver having a setting of the limitation information when the printer driver included in the printer driver set is installed in the computer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a diagram illustrating a user interface (UI) when a printer driver is customized by a customization tool according to the exemplary embodiment of the present invention.

FIG. 5 is a diagram illustrating a UI when the printer driver is customized by the customization tool according to the exemplary embodiment of the present invention.

FIG. 14 is a diagram illustrating printing performed by the customized printer driver according to the exemplary embodiment of the present invention.

FIG. 18 is a diagram illustrating a memory map in a computer-readable storage medium (recording medium) for storing various data processing programs that can be read by an information processing apparatus according to the exemplary embodiment of the present invention.

FIG. 20 is a diagram illustrating non-customized printer driver information and customized printer driver information as illustrated in FIG. 19.

DETAILED DESCRIPTION OF THE EMBODIMENTS

Various exemplary embodiments, features, and aspects of the invention will be described in detail below with reference to the drawings.

Figure 19:
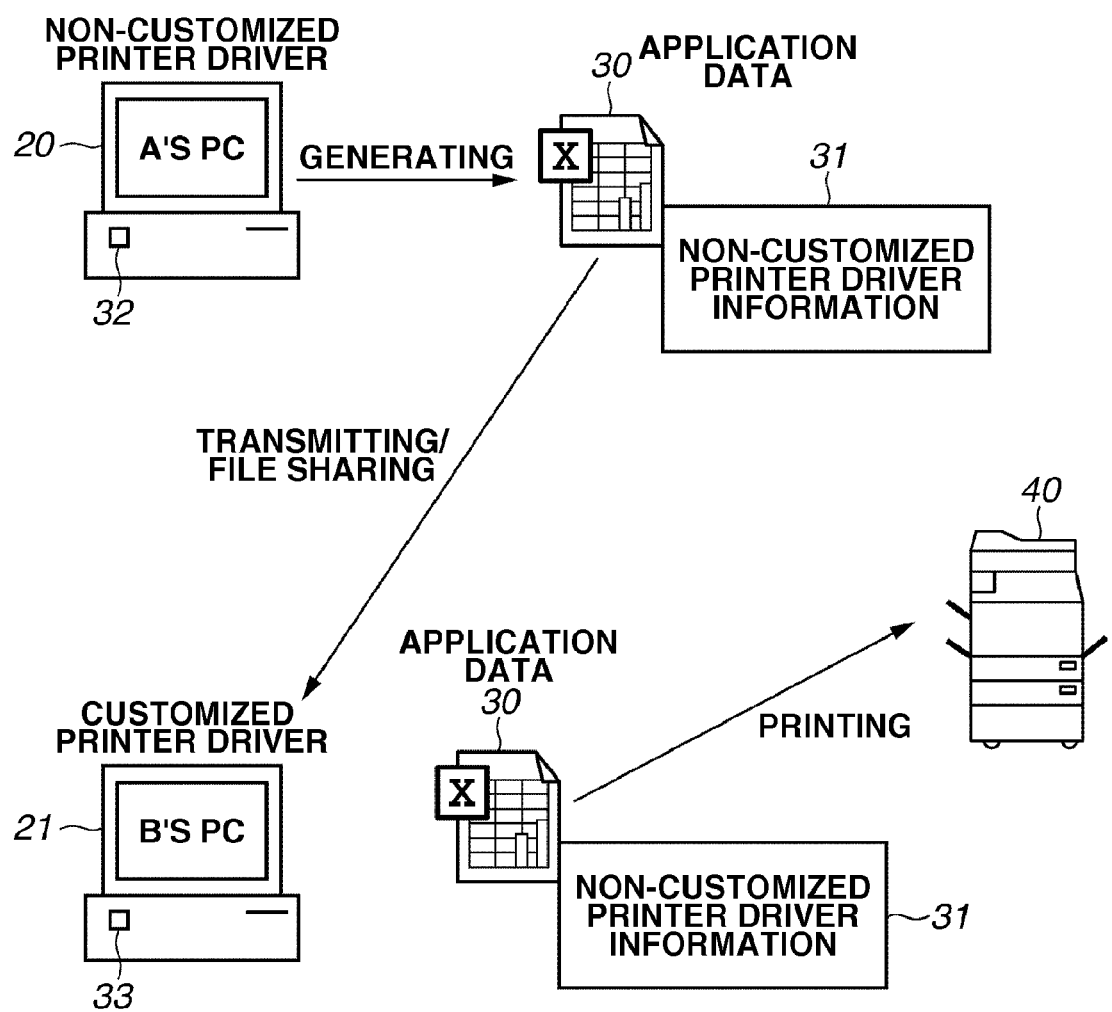
FIG. 19 is a diagram illustrating a problem when data generated by an application is printed by using a customized printer driver.

With reference to FIGS. 19 and 20, premises for printing data generated by an application using a customized printer driver will be described.

FIG. 19 is a diagram illustrating a problem when data generated by an application is printed by using a customized printer driver.

As illustrated in FIG. 19, setting information 31 of a non-customized printer driver is stored in an application data (file) 30 generated by an A's personal computer (PC) 20.

When printing the file 30 with a B's PC 21 in which a customized driver is installed, a user obtains a print result generated according to the setting information 31 of the non-customized driver stored in the file 30.

FIG. 20 illustrates the non-customized printer driver information (non-customized driver setting information 31) and the customized printer driver information (customized printer driver setting information 32) as illustrated in FIG. 19.

FIG. 20 illustrates an example of initial values of the printer drivers installed in the A's PC 20 and the B's PC 21 as illustrated in FIG. 19.

FIG. 20 indicates an example of initial values 32 of the printer driver installed in the A's PC 20, which is not customized. The application data 30 generated based on the setting information 32 stores the setting information 32 as the printer setting information 31.

When the user opens the application data 30 by using the customized B's PC 21 and prints by using the printer driver installed in the PC 21 with the printer 40, the following case can occur.

The initial values of the printer driver in the B'S PC 21 are changed as illustrated in the application data 33 of FIG. 20. However, the user obtains the print result of the application data 30 generated according to the setting information 31 held in the application data 30.

More specifically, the print result is generated according to the setting information 32 of the printer driver installed in the A's PC 20.

The printer driver can be customized so that B's PC 21 does not permit (limit) a certain function (for example, color print). However, even when the printer driver is customized not to permit the color print, the color print can be performed according the printer setting information 31 held in the application data 30.

Figure 1:
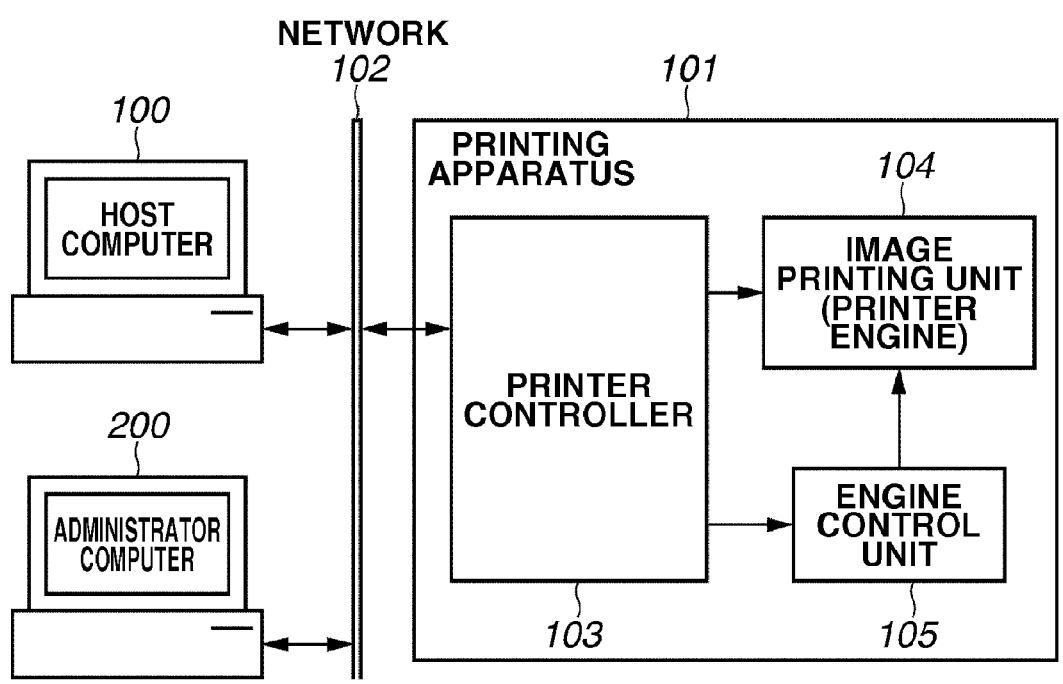
FIG. 1 illustrates a configuration of a printing system that can be applied to an information processing apparatus according to exemplary embodiments of the present invention.

FIG. 1 illustrates a configuration of a printing system that can be applied to an information processing apparatus according to exemplary embodiments of the present invention. FIG. 1 illustrates an administrator computer 200, where a customization tool that can change the initial values of the printer driver is installed. The administrator computer 200 can customize the printer driver by using the customization tool.

A host computer 100 can install the printer driver therein. The printer driver (customized printer driver) that has been customized in the administrator computer 200 can be installed. The host computer 100 generates the print data by using the printer driver and can transmit the print data to a printing apparatus 101 via a network 102.

The printing apparatus 101 includes a printer controller 103 that overall controls the printing apparatus 101. An engine control unit 105 controls an image printing unit (printer engine) 104. The printing apparatus 101 having the above-described configuration receives the print data generated by the host computer 100 and executes the print processing based on the received print data under control by the printer controller 103.

Figure 2:
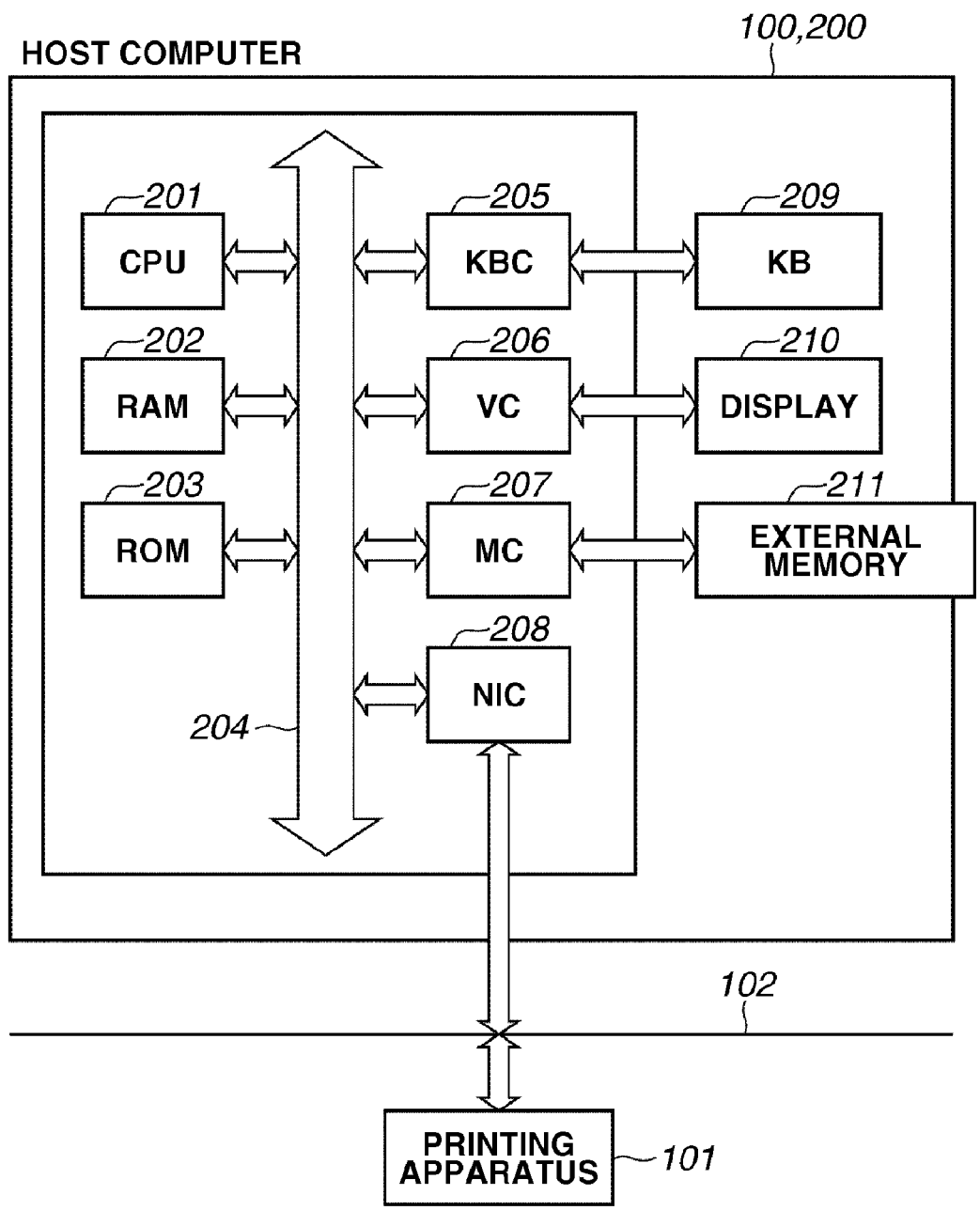
FIG. 2 is a block diagram illustrating a configuration of an administrator computer and a host computer illustrated in FIG. 1.

FIG. 2 is a block diagram illustrating a configuration of the administrator computer 200 and the host computer 100 illustrated in FIG. 1. In FIG. 2, a central processing unit (CPU) 201 controls each device connected to a system bus 204 based on a program stored in a read only memory (ROM) 203 or an external memory 211 to overall control the entire apparatus. Further, a random access memory (RAM) 202 functions as a main memory and a working area of the CPU 201.

A keyboard controller (KBC) 205 controls input from a pointing device (PD) such as a keyboard (KB) 209 and a mouse (not illustrated). A video card (VC) 206 controls display of a display 210. The display 210 may be a cathode ray tube (CRT), a liquid crystal display (LCD) or any other types.

A memory controller (MC) 207 controls access between the host computer and an external memory 211 such as a hard disk (HD), a floppy disk (FD), and a compact disk read only memory (CD-ROM). A network interface card (NIC) 208 controls communication between a host computer and the printing apparatus 101 via the network 102. A method for customizing the printer driver by the customization tool of the present exemplary invention will be described as below.

FIGS. 3 to 6 are diagrams illustrating user interfaces (UI) when the printer driver is customized by the customization tool of the present exemplary embodiment. FIG. 3 illustrates a customization screen 11 right after the printer driver to be customized is specified and the screen is opened. Further, FIG. 3 illustrates a customization screen 12 after the setting values of the printer driver are customized (changed) by the customization tool.

Figure 4:
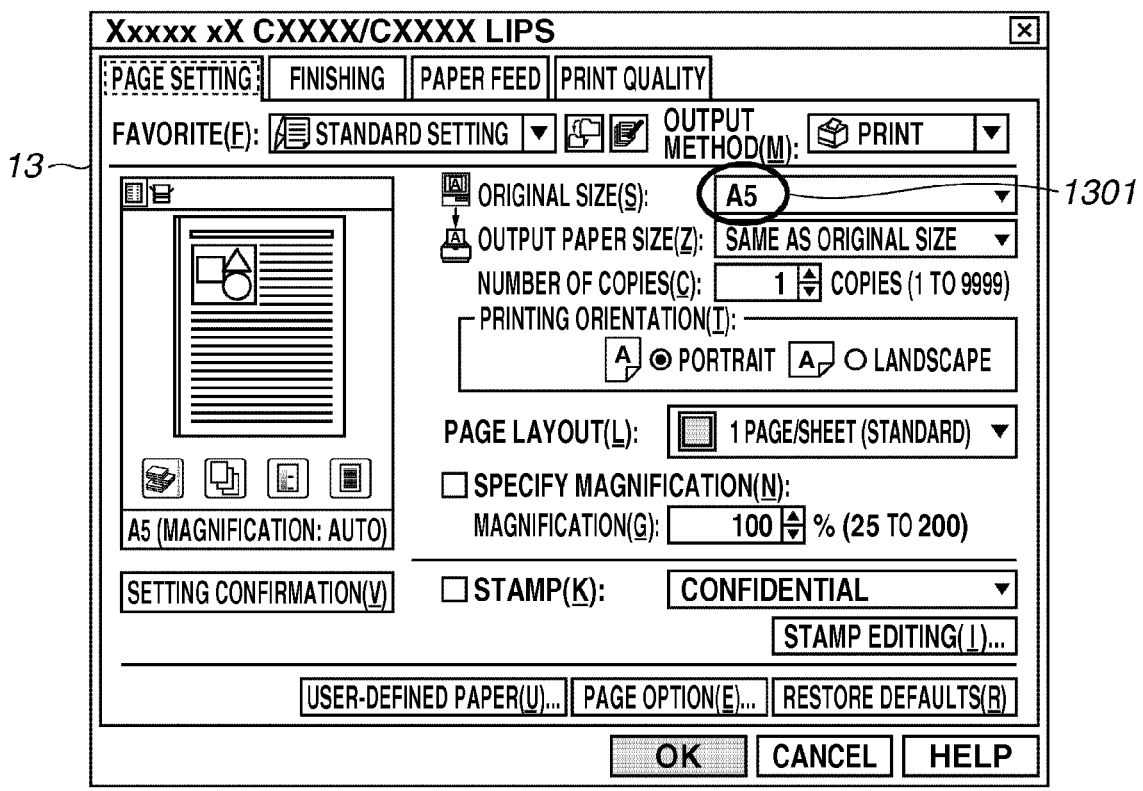
FIG. 4 is a diagram illustrating a UI when the printer driver is customized by the customization tool according to the exemplary embodiment of the present invention.

As indicated by 1101, the initial value of "Original size" of the printer driver is "A4", which can be changed to "A5" by the customization tool as indicated by 1201. FIG. 4 illustrates an initial screen 13 after the customized (changed) printer driver as illustrated in FIG. 3 has been installed. As indicated by 1301, the initial value of the "Original size" is changed to "A5" as customized in the screen 12 of FIG. 3.

Figure 6:
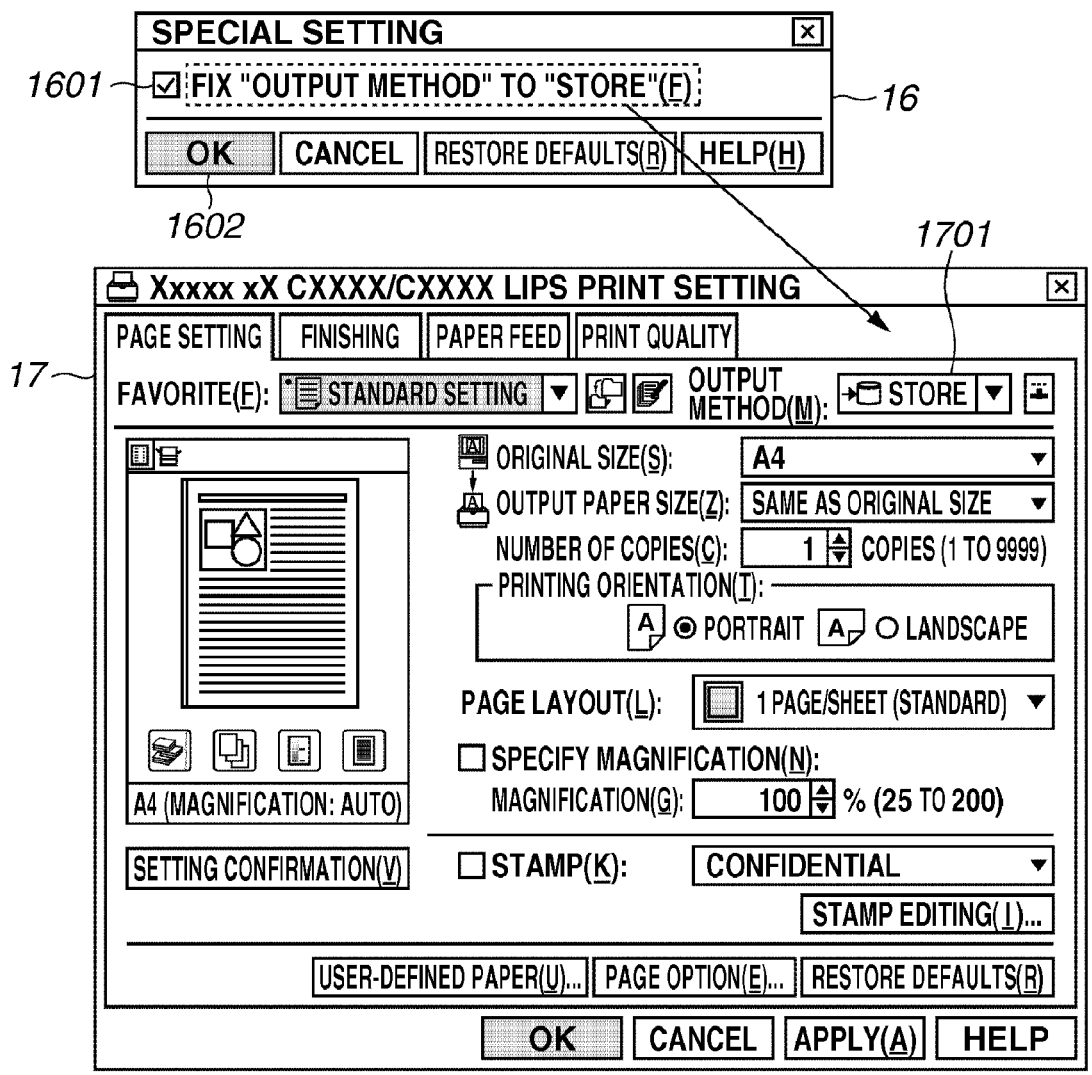
FIG. 6 is a diagram illustrating a UI when the printer driver is customized by the customization tool according to the exemplary embodiment of the present invention.

In addition to "change of initial value" as illustrated in FIG. 3, the customization tool can customize the printer driver to add a special function as illustrated in FIGS. 5 and 6. FIG. 5 illustrates a customization screen 14 of the customization tool when the printer driver having a special function is customized. Further, a "special" button 1401 is displayed on the customization screen 14. When the customization button 1401 is pressed down, a special setting screen 15 is displayed. The customization screen 1401 is not displayed on the UI (setting screen) of the printer driver after the printer driver has been installed.

Examples of the special functions include (1) and (2) as described below.

(1) The special functions include a function which always includes or does not include, for example, unique information of a user and priority order information in the print data without displaying them on the screen after the printer driver has been installed. The function can switch commands that give an instruction to a print controller.

(2) Further, the special functions include a function for setting a limit (one or a plurality of setting values within the setting information are fixed to a specified value or limited to a specified range) on setting information after the printer driver has been installed. The above-described special function (2) will be described as below.

A function for fixing "Output method" to "Store" will be described. In a case of the example, when the customization button 1401 as illustrated in FIG. 5 is pressed down, a special setting screen 16 as illustrated in FIG. 6 is displayed.

In the special setting screen 16, when a check box 1601 is set to "ON" (checked) and an OK button 1602 is pressed down, the printer driver can be customized so that the "Output method" is fixed to "Store".

As described above, in the customized printer driver, "Output method" in the printer driver is fixed to "Store" as indicated by 1701 on a print setting screen 17 of the printer driver as illustrated in FIG. 6. The setting information of the printer driver is limited so that "output method" is fixed to "Store".

In addition to fix "output method" to "store", the limit of the setting information can also includes fixing "paper size" to "A4", "page layout" to "2 pages/sheet", "printing method" to "two-sided", and "color mode" to "monochrome".

Further, a check box of "Fix all to changed setting values" is provided on the special setting screen 16. The setting values edited on the customization screen are all fixed by checking the "Fix all to changed setting values" and pressing down an OK button 1602. Thus, the setting values may also be limited. At this point, the setting values to be fixed may be fixed to one value or fixed within a certain part (part having a selection range).

When the setting values are fixed within the selection range, the setting values are edited (changed) to have the selection range, for example, "paper size" is fixed to "A5", "A4", or "B5" and "page layout" is fixed to "2 pages/sheet" or "4 pages/sheet". On the special setting screen 16, the check box of "Fix all to changed setting values" is check-marked and the OK button 1602 is pressed down. By this operation, the limitation for fixing the setting values within a certain part (part having the range) can be added, for example, "paper size" is fixed to "A5", "A4", or "B5" and "page layout" is fixed to "2 pages/sheet" or "4 pages/sheet".

Further, when the setting value is fixed to one value, the setting value is edited to be fixed to one value, for example, "Print method" is fixed to "two-sided", "color mode" is fixed to "monochrome". On the special setting screen 16, the check box of "Fix all to changed setting values" is check-marked and the Ok button 1602 is pressed down. By this operation, the limitation for fixing the setting values to one value can be performed, and "printing method" is fixed to "two-sided", and "color mode" to "monochrome".

Figure 7:
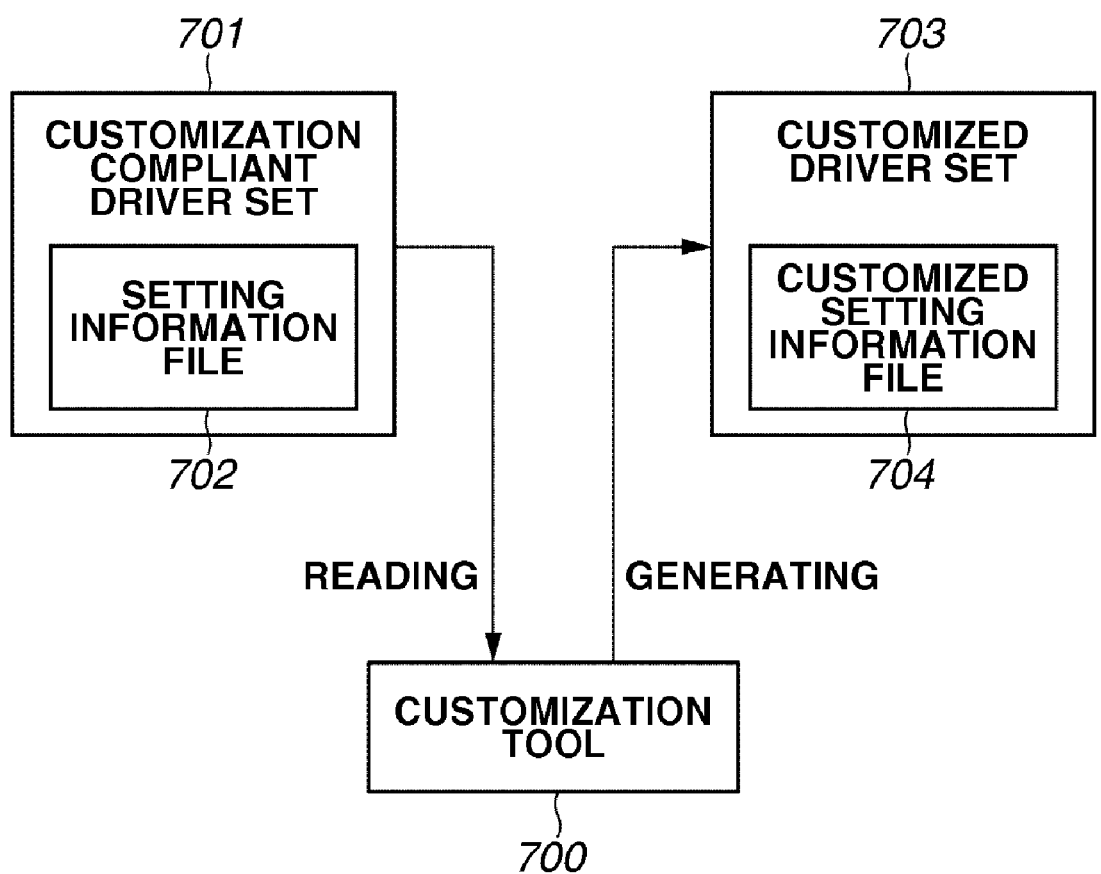
FIG. 7 is a diagram illustrating customization processing performed by the customization tool according to the exemplary embodiment of the present invention.
Figure 8:
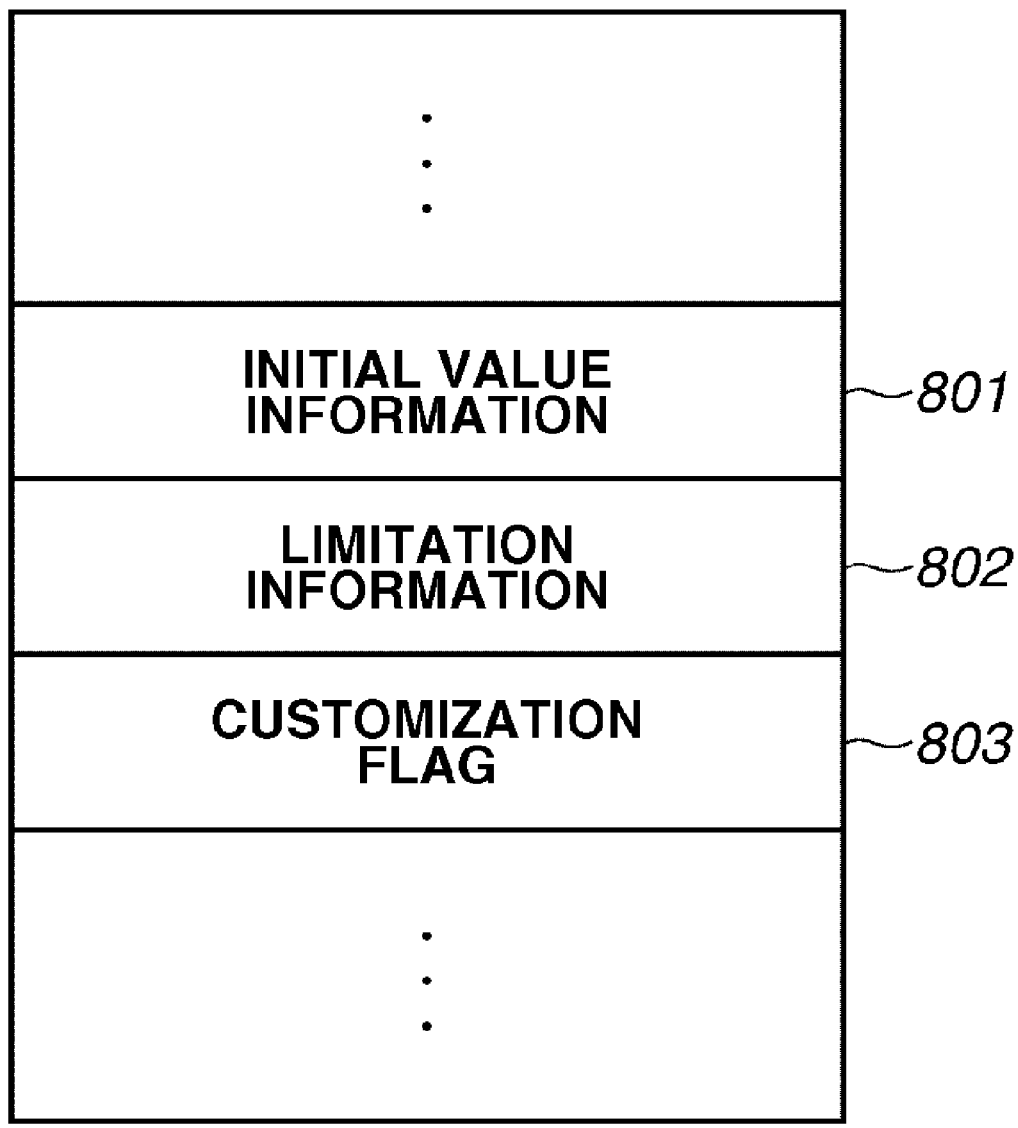
FIG. 8 is a diagram illustrating one example of a configuration of a setting information file included in a printer driver set that can be customized by the customization tool according to the exemplary embodiment of the present invention.

When the "special function" is described in the present embodiment, the above-described special function (2) (i.e.; function for providing the limitation to the setting information of the printer driver) is described. With reference to FIGS. 7 and 8, the customization tool of the present exemplary embodiment will be described as below.

FIG. 7 is a diagram illustrating customization processing performed by the customization tool of the present exemplary embodiment. In the customization of the printer driver according to the present exemplary embodiment, the setting information file is edited so that the items of the print setting that allows a user to change the setting value can be customized in addition to the default value (initial value) of the print setting. The above-described setting information file is also referred to as a user-interface printer description (UPD) file.

FIG. 7 illustrates a customization tool 700. A customization compliant printer driver set 701 is compliant with the customization performed by the customization tool 700. A printer driver set 703 is customized by the customization tool 700.

The printer driver set includes the (customized) printer driver and an installation program for executing installation and set-up of the printer driver in a predetermined directory. A pair of the setting information for installation and the printer driver that does not include the installation program is sometimes referred to as the printer driver set.

The user (administrator) issues instructions to start up the customization tool 700 in the administrator computer 200. Next, as the printer driver set to be customized, a customization compliant driver set 701 stored in the external memory 211 of the administrator computer 200 is specified. The customization tool 700 reads the setting information file 702 of the specified customization compliant driver set 701 into the RAM 202 of the administrator computer 200.

The customization compliant driver set 701 includes a program code file of the printer driver and the setting information file 702.

Next, when the user performs customization setting operations (operation for changing the setting value and operation for setting the limit by the above-described special function), according to the operations, the customization tool 700 edits the setting information file 702 that has been read in a memory. When the customization is ended, the customization tool 700 generates the customized driver set 703 including the customized setting information file 704 and stores the customized driver set 703 in a recording medium such as the external memory 211 of the administrator computer 200.

FIG. 8 is a diagram illustrating one example of a configuration of a setting information file included in a printer driver set that can be customized by the customization tool according to the present exemplary embodiment. As illustrated in FIG. 8, the setting information files 702 and 704 include initial value information 801, limitation information 802, and a customized flag 803.

The initial value information 801 stores the initial value of the setting value of the customized printer driver as illustrated in FIG. 3. The limitation information 802 includes the setting (e.g.; a limit fixing "output method" to "store") that provides the limitation of the setting information of the printer driver by the above-described special function.

A customization flag 803 is set to "ON", when the limitation (limitation fixing the setting value) is imposed on the setting information of the printer driver by the above-described special function. More specifically, when the limitation is not imposed on the setting information of the printer driver by the above-special function, the customized flag 803 is set to "OFF". The customized flag 803 functions as recognition information that enables the user to recognize that the printer driver is the customized printer driver (the limitation is imposed on the setting information of the printer driver).

When the customized driver set 703 is installed, the program code of the printer driver and the customized setting information file 704 are copied into a system folder of the external memory 211 of the host computer 100. Information of various types of printers and the initial value information 801 are registered in a registry related to printing of an office system (OS). Further, in a case where the customized flag 803 has been referred to and set to "ON", the limitation information 802 is separately registered in another registry of the OS.

With reference to FIG. 8, the setting information file includes the limitation information 802 and the customized flag 803, however, separate from the setting information file, the driver set may include the limitation information 802 and the customized flag 803.

Figure 9:
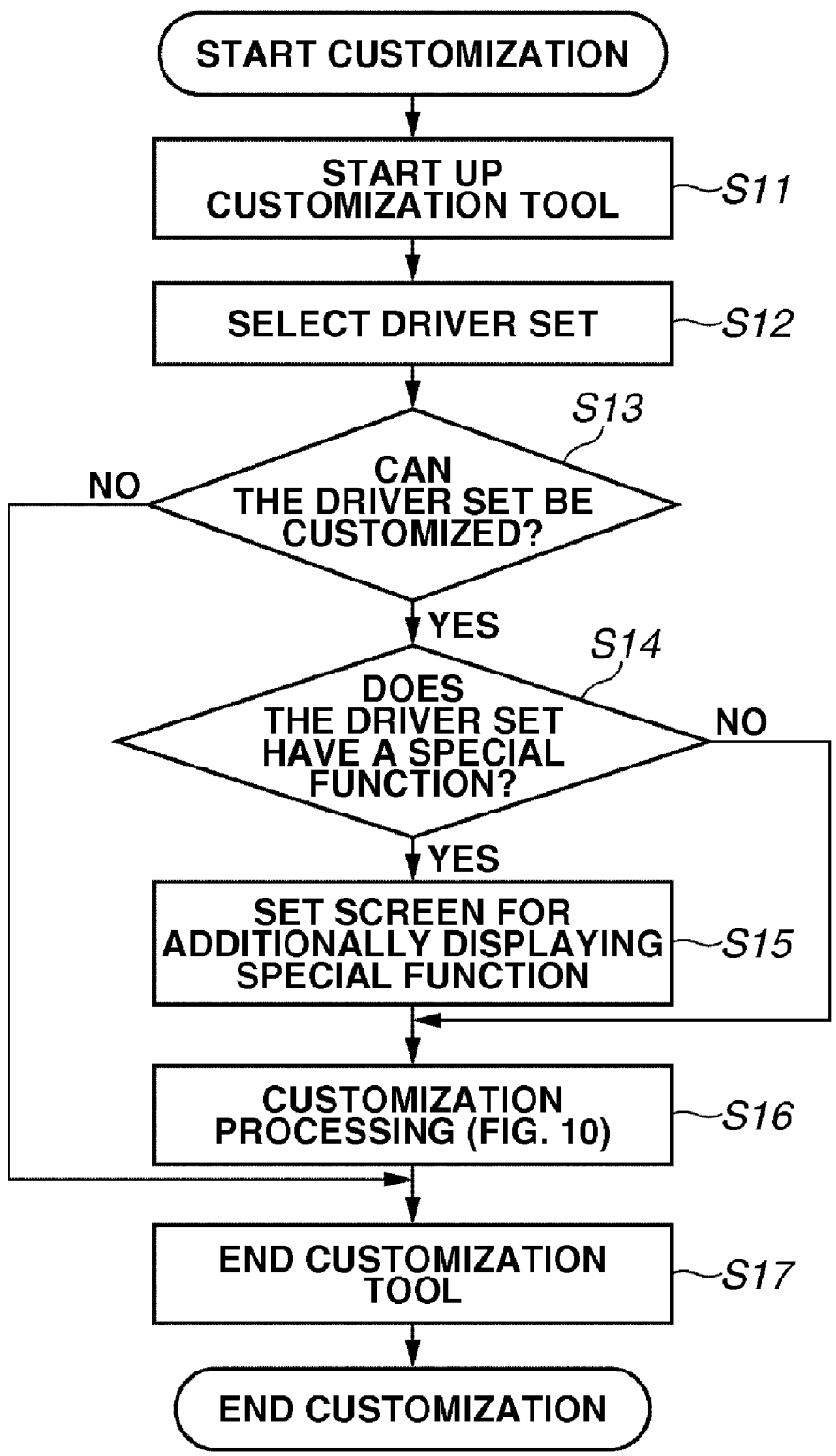
FIG. 9 is a flowchart illustrating one example of a customization method performed by the customization tool according to the exemplary embodiment of the present invention.

FIG. 9 is a flowchart illustrating one example of a customization performed by the customization tool of the present invention. The processing of the flowchart corresponds to a function that can be realized by an execution in which the CPU 201 of the administrator computer 200 loads a program stored in the external memory 211 into the RAM 202.

Upon receiving an instruction for starting up the customization tool from the user via the KB 209 or the PD of the administrator computer 200, the CPU 201 of the administrator computer 200 starts up the customization tool in step S11.

Next, in step S12, the CPU 201 of the administrator computer 200 receives a selection of the printer driver to be customized via the KB 209 or the PD. In this case, a folder including the printer driver set or a compressed file of the printer driver file group are to be selected.

Next, in step S13, the CPU 201 of the administrator computer 200 determines whether the printer driver set selected in step S12 can be customized by the customization tool. The determination is made according to an existence of the file to be customized in the printer driver set or analysis of a description of an information file necessary for the installation.

In step S13, when it is determined that the printer driver set can be customized, the CPU 201 of the administrator computer 200 advances the processing to step S14. In step S14, the CPU 201 of the administrator computer 200 determines whether the special function can be set by the printer driver set selected in step S12.

When it is determined that the special function can be set in step S14, the CPU 201 of the administrator computer 200 sets the special function to be displayed on the customization screen in step S15. For example, as illustrated in FIG. 5, the special button 1401 is set to be displayed when the customization screen 14 is displayed.

When the processing in step S15 is ended, the CPU 201 of the administrator computer 200 advances the processing to step S16. On the other hand, in step S14, when it is determined that the special function can not be set, the CPU 201 of the administrator computer 200 advances the processing directly to step S16.

Figure 10:
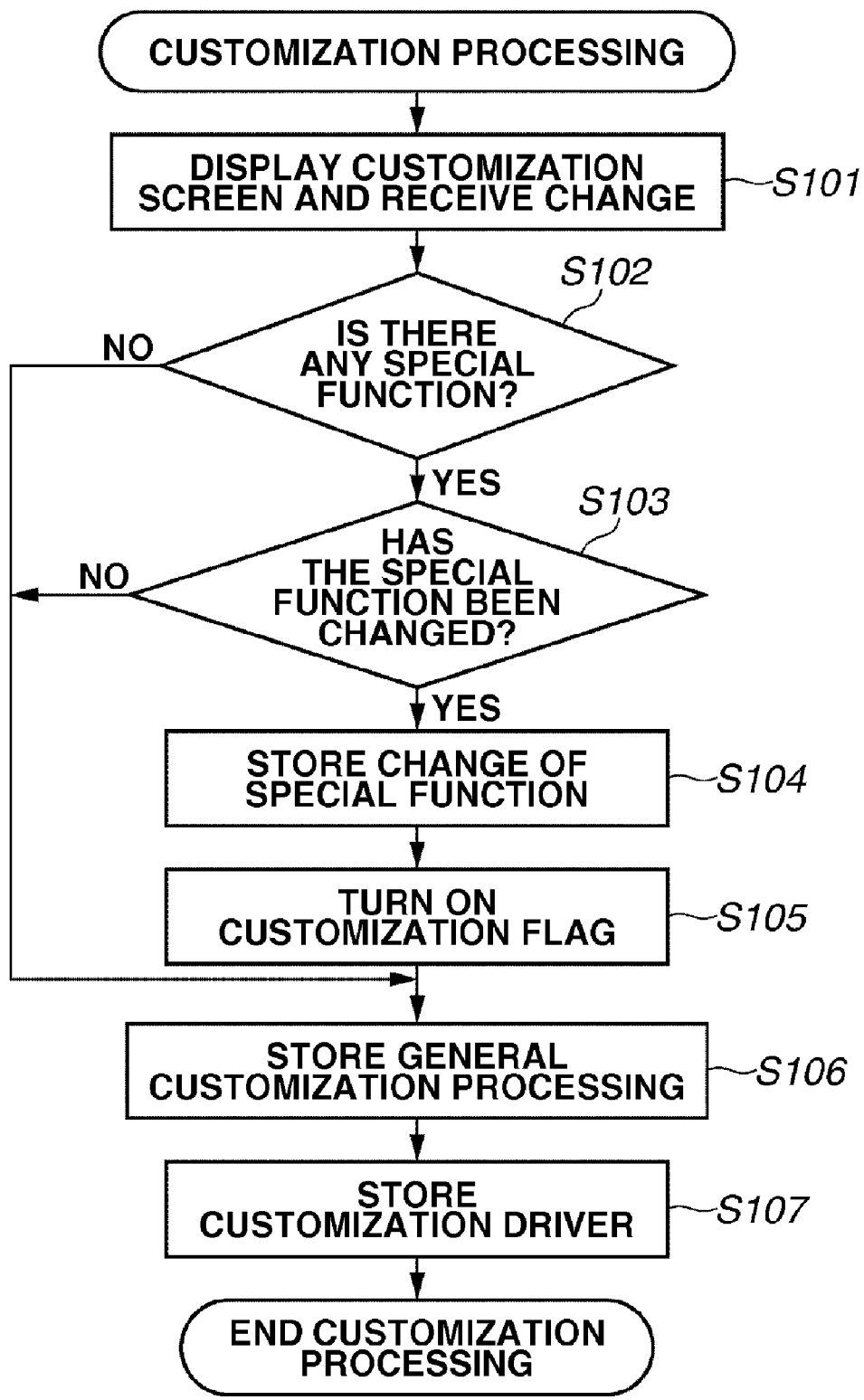
FIG. 10 is a flowchart of customization processing in detail as illustrated in step S16 of FIG. 9.

In step S16, the CPU 201 of the administrator computer 200 performs the customization processing, which is stored in a hard disk of the personal computer as the customized printer driver set. FIG. 10 illustrates the details of the customization processing in step S16.

When the customization processing in step S16 is finished, the CPU 201 of the administrator computer 200 ends the customization tool in step S17. On the other hand, in step S13, when it is determined that the printer driver set selected in step S12 can not be customized, the CPU 201 of the administrator computer 200 ends the customization tool without change in step S17.

Next, with reference to FIG. 10, the details of the customization processing as illustrated in step S16 of FIG. 9 will be described. FIG. 10 is a flowchart of customization processing in detail as illustrated in step S16 of FIG. 9. The processing of the flowchart corresponds to the function that can be realized by the execution in which the CPU 201 of the administrator computer 200 loads the program stored in the external memory 211 into the RAM 202.

In step S101, the CPU 201 of the administrator computer 200 displays the customization screen (e.g.; FIGS. 3 and 5) as the UI on the display 210 to receive a change (edition) of the setting value. Upon detecting an instruction for ending the change (pressing down an OK button 1102 as illustrated in FIG. 3), the CPU 201 of the administrator computer 200 advances the processing to step S102. When it is detected that the cancel button 1103 as illustrated in FIG. 3 is pressed down (not illustrated in the flowchart), the CPU 201 of the administrator computer 200 ends the customization without change.

Next, in step S102, the CPU 201 of the administrator computer 200 determines whether the printer driver includes the special function. When it is determined that the printer driver includes the special function, in step S103, it is determined whether the special function has been changed.

In step S103, when it is determined that the special function has been changed (more specifically, the limitation is imposed on the setting information of the printer driver) the CPU 201 of the administrator computer 200 advances the processing to step S104. In step S104, the CPU 201 of the administrator computer 200 generates the limitation information 802 (FIG. 8) based on the change of the above-described special function and stores the limitation information 802 in the RAM 202.

Next, in step S105, the CPU 201 of the administrator computer 200 turns on (sets to ON) a flag (customization flag 803 in FIG. 8) indicating the customized driver and stores the flag in the RAM 202. Then, the processing proceeds to step S106.

On the other hand, when it is determined in step S103 that the special function has not been changed or when it is determined in step S102 that the displayed sheet does not include the special function, the CPU 201 of the administrator computer 200 advances the processing directly to step S106.

In step S106, the CPU 201 of the administrator computer 200 stores the change performed by an ordinal customization processing in a memory. More specifically, it is determined whether the setting other than the setting of the above-described special function has been changed (setting change of the initial value). When it is determined that setting has been chanted, the CPU 201 of the administrator computer 200 generates the initial value information 801 (FIG. 8) based on the change and stores the initial value information 801 in the RAM 202.

Next, in step S107, the CPU 201 of the administrator computer 200 generates the customized setting information file 704 including the limitation information 802 stored in the above-described RAM 202, the customized flag 803, and initial value information 801 (FIG. 7). The CPU 201 of the administrator computer 200 includes the customized setting information file 704 that is generated as described above in the printer driver set and stores the file 704 in the external memory 211 of the administrator computer 200. More specifically, the customized driver set 703 as illustrated in FIG. 7 is stored.

When the customized driver set 703 is installed into the host computer 100, the customized setting information file 704 including the limitation information 802 and the customized flag 803 is included in the driver set and stored so that the limitation information 802 and the customized flag 803 can be separately registered in the host computer 100 (OS). Then, the customization processing is ended.

Figure 11:
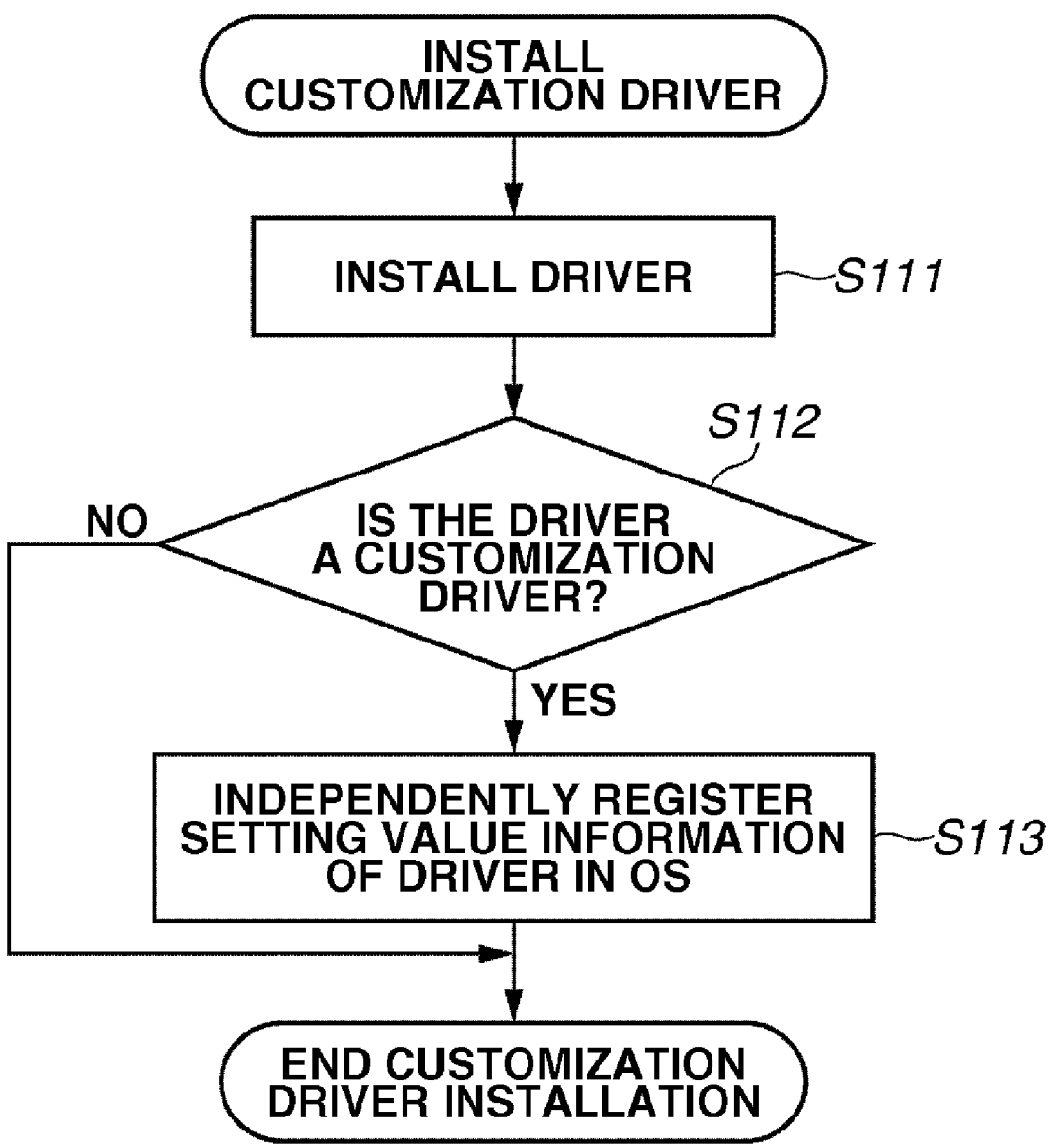
FIG. 11 is a flowchart of processing for installing a customized printer driver in detail according to the exemplary embodiment of the present invention.

Next, with reference to FIG. 11, the details of processing for installing the customized printer driver are described. FIG. 11 is a detailed flowchart of processing for installing a customized printer driver according to the present exemplary embodiment. The processing of the flowchart corresponds to the function that can be realized by the execution in which the CPU 201 of the host computer 100 loads the program stored in the external memory 211 into the RAM 202.

Upon receiving an instruction for installing the printer driver (including specifying the driver set) from the user via the KB 209 or the PD of the host computer 100, the CPU 201 of the host computer 100 starts up the processing of the flowchart.

In step S111, the CPU 201 of the host computer 100 starts to install the printer driver. More specifically, the CPU 201 of the host computer 100 copies the program code of the printer driver included in the driver set that is instructed to be installed and a setting information file to a predetermined system folder of the external memory 211 of the host computer 100. Further, the CPU 201 of the host computer 100 registers information about various types of printers and the initial value information 801 within the setting information file, in the registry related to printing the OS.

Next, in step S112, the CPU 201 of the host computer 100 determines whether the installed printer driver is customized. At this point, the CPU 201 of the host computer 100 determines that the driver is customized when there is the customization flag turned on (set to ON) in the step S105 of the FIG. 10, in the above-described setting information file.

In step S112, when it is determined that the installed printer drivers is the customized printer driver, the CPU 201 of the host computer 100 advances the processing to step S113.

In step S113, the CPU 201 of the host computer 100 registers the limitation information 802 included in the above-described setting information file separately in another place in the OS (the registry different from the above-described registry or the other specific file). Then, the installation operation is ended.

On the other hand, in step S112, when it is determined that the installed printer driver is not customized, the CPU 201 of the host computer 100 ends the installation processing without change.

Figure 12:
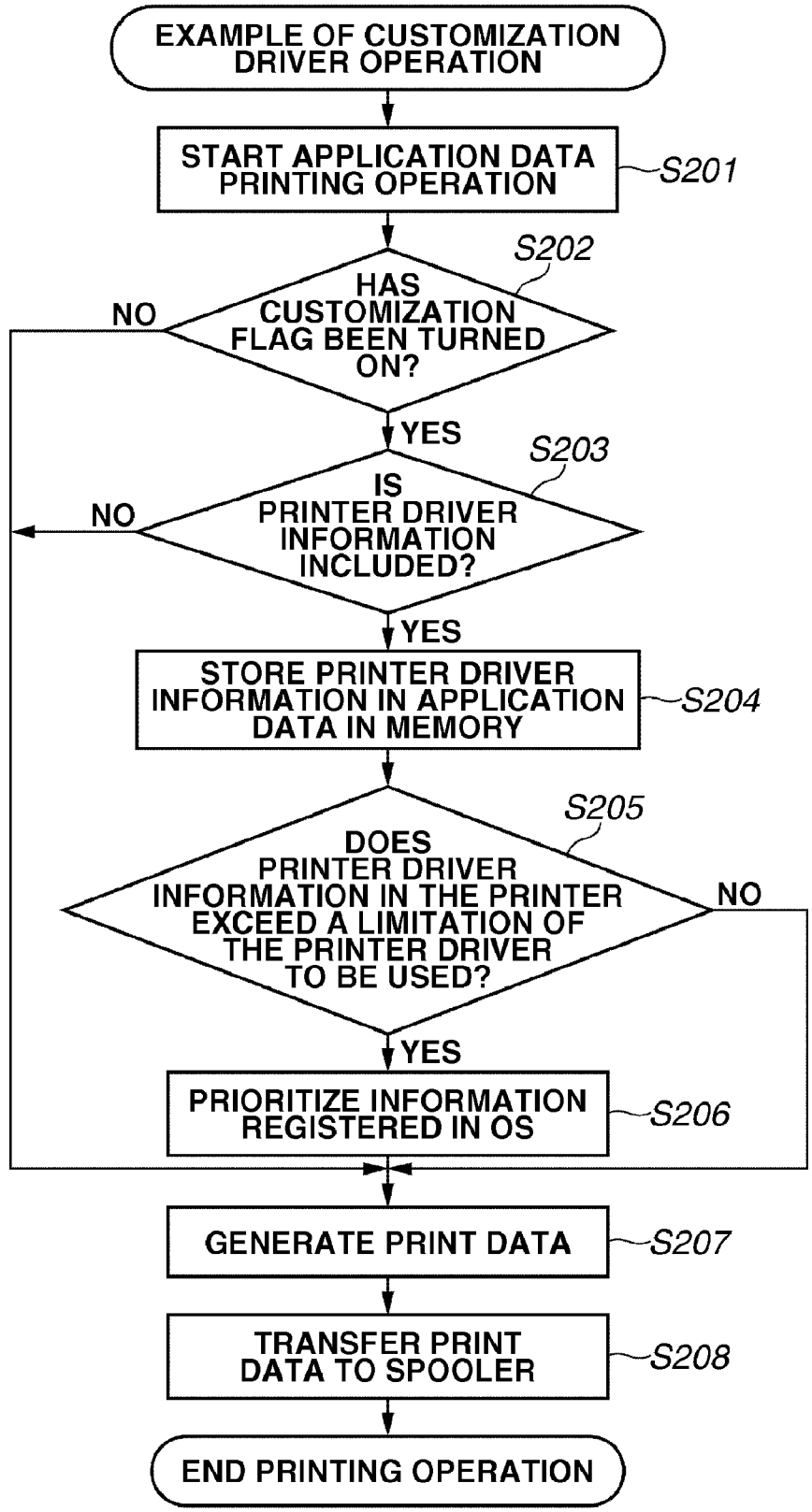
FIG. 12 is a flowchart illustrating one example of a printing operation performed by the customized printer driver according to the exemplary embodiment of the present invention.

Next, with reference to FIGS. 12 to 14, the printing operation performed by the customized printer driver will be described. FIG. 12 is a flow chart illustrating one example of a printing operation performed by the customized printer driver according to the exemplary embodiment of the present invention. The processing of the flowchart corresponds to the function that can be realized by the execution in which the CPU 201 of the host computer 100 loads the program stored in the external memory 211 into the RAM 202.

Figure 13:
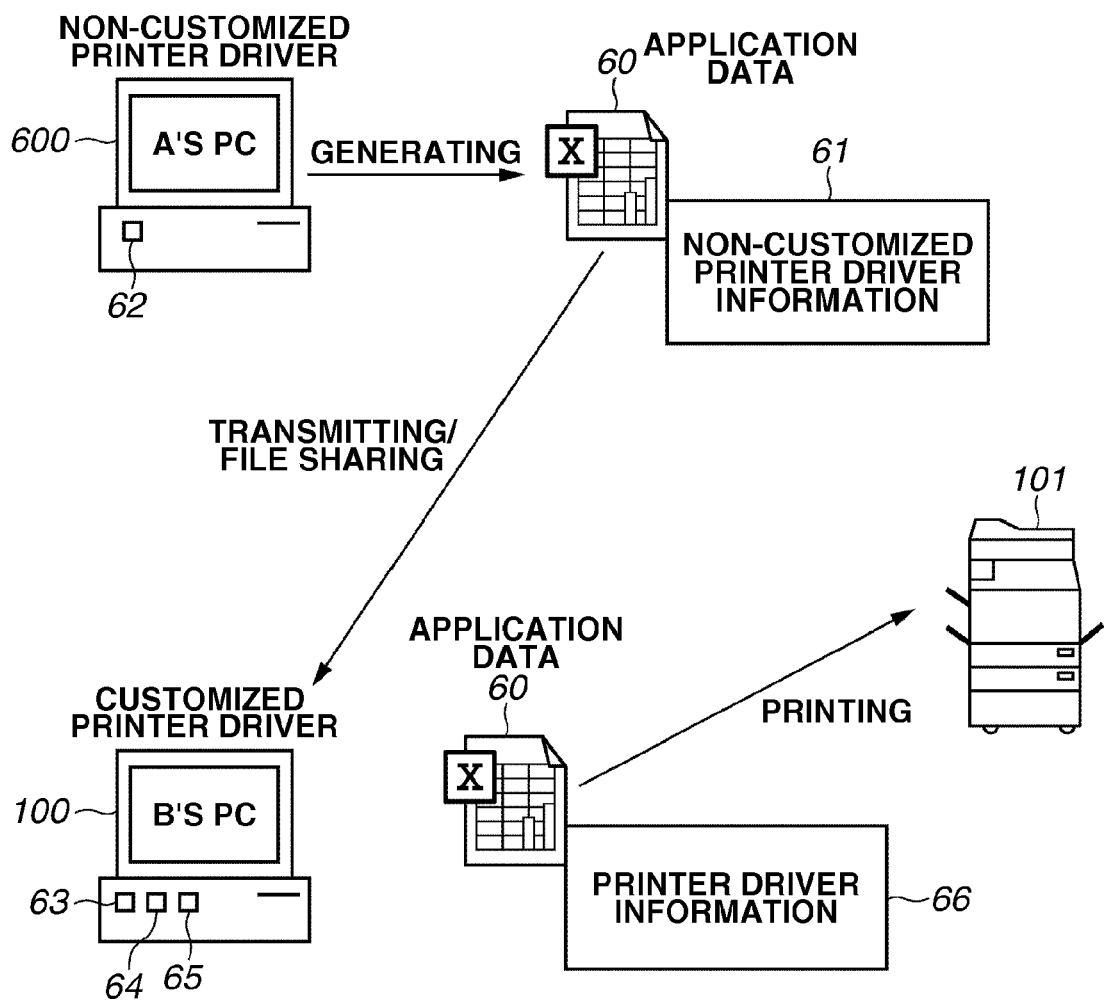
FIG. 13 is a diagram illustrating printing performed by the customized printer driver according to the exemplary embodiment of the present invention.

FIGS. 13 and 14 are diagrams illustrating printing performed by the customized printer driver according to the exemplary embodiment of the present invention. The user gives instructions to print application data via the KB 209 or the PD of the CPU 201 of the host computer 100. It is assumed that an instruction is given for printing the application data 60 generated by the A's PC 600 as illustrated in FIG. 13.

Upon receiving the print instruction, the CPU 201 of the host computer 100 starts the printing operation of the above-described application data 60 in step S201.

Next, in step S202, the CPU 201 of the host computer 100 determines whether the printer driver to be used for printing the application data 60 is the customized printer driver (the primary determination). This is determined depending on whether the customization flag (customization flag registered in the registry in the OS of the host computer 100) 65 of the printer driver to be used is turned on.

In step S202, when the customized flag 65 is turned off, it is determined that the printer driver to be used is not the customized printer driver. Then, the CPU 201 of the host computer 100 advances the processing directly to step S207. On the other hand, when it is determined that the customized flag 65 is turned on in step S202, it is determined that the printer driver to be used is the customized printer driver. Then, the CPU 201 of the host computer 100 advances the processing to step S203.

In step S203, the CPU 201 of the host computer 100 determines whether the application data 60 to be printed (data on which the printing processing is to be performed) holds the printer driver information (setting information) (second determination).

In step S203, when it is determined that the application data 60 to be printed does not hold the printer driver information, the CPU 201 of the host computer 100 advances the processing directly to step S207.

On the other hand, in step S203, when it is determined that the application data 60 to be printed holds the printer driving information, the CPU 201 of the host computer 100 advances the processing to step S204. More specifically, when it is determined in the above-described primary determination that the printer driver is customized (YES in step S202), and in the above-described second determination that the data on which the printing processing is to be performed holds setting information (YES in step S203), the processing proceeds to step S204.

In step S204, the CPU 201 of the host computer 100 temporarily stores the printer driver information 61 in the application data 60 into the RAM 202. The printer driver information 61 has the same setting as the printer driver information 62 of the non-customized printer driver installed in the PC 600 when the application data 60 is generated by the B's PC 600.

Next, in step S205, the CPU 201 of the host computer 100 determines whether the setting exceeding a range limited by the limitation information 64 exists in the printer driver information 61 stored in the RAM 202 in step S204.

In step S205, when it is determined that the setting exceeding the range limited by the limitation information 64 does not exist in the printer driver information 61 in the application data, the CPU 201 of the host computer 100 advances the processing to step S207. In this case, the printer driver information 61 is used as the printer driver information 66 as it is.

On the other hand, in step S205, when it is determined that the setting exceeding the range limited by the limitation information 64 exists in the printer driver information 61 in the application data, the CPU 201 of the host computer 100 advances the processing to step S206.

In step S206, the CPU 201 of the host computer 100 prioritizes the information registered in the OS. More specifically, the setting value of the printer driver information 61 that exceeds the range having the limitation indicated by the limitation information 64 is not employed, but the setting value of the setting information 63 of the printer driver is adopted. On the other hand, the setting value that does not exceed the range having the limitation indicated by the limitation information 64 is employed. More specifically, the CPU 201 of the host computer 100 generates the printer driver information 66 by reflecting the setting value of the printer driver information 61 on the setting information 63 of the printer driver within the range having the limitation indicated by the limitation information 64.

In the example as illustrated in FIG. 14, since "paper size: A4" in the printer driver information 61 does not exceed the limitation information 64, it is employed (reflected) as it is. On the other hand, "page layout: 1 page/sheet", "printing method: one-sided", and "color mode: color" in the printer driver information 61 exceed the limitation information 64. Thus, these setting values are not reflected, but the setting values of "page layout: 2 pages/sheets", "printing method: two-sided", and "color mode: Monochrome" are employed. Accordingly, the printer driver information 66 including the setting values of "paper size: A4", "page layout: 2 pages/sheets", "printing method: two-sided", and "color mode: Monochrome" is generated. The processing proceeds to step S207.

Next, in steps S207 and S208, the CPU 201 of the host computer 100 executes the printing processing of the application data based on the printer driver information 66 generated as described above. More specifically, in step S207, the CPU 201 of the host computer 100 generates the print data of the application data according to the setting value in the printer driver information 66. Finally, in step S208, the CPU 201 of the host computer 100 transmits the print data generated in step S207 to a spooler and ends the printing operation.

As described above, even when the application data that holds the printer driver information is printed using the customized printer driver, the application data can be printed according to the setting values (limit) of the customized driver. In this case, the application data can be printed reflecting the printer driver information within the application data within the range having the customized limit.

When the customized printer driver is used for printing the application data 60, the printer driver information 61 may be ignored and the processing for printing the application data based on the setting information 63 of the printer driver may be executed. With this arrangement, even when the application data holding the printer driver information is printed by the customized printer driver, the application can be printed according to the setting values (limit) of the customized printer driver.

Figure 15:
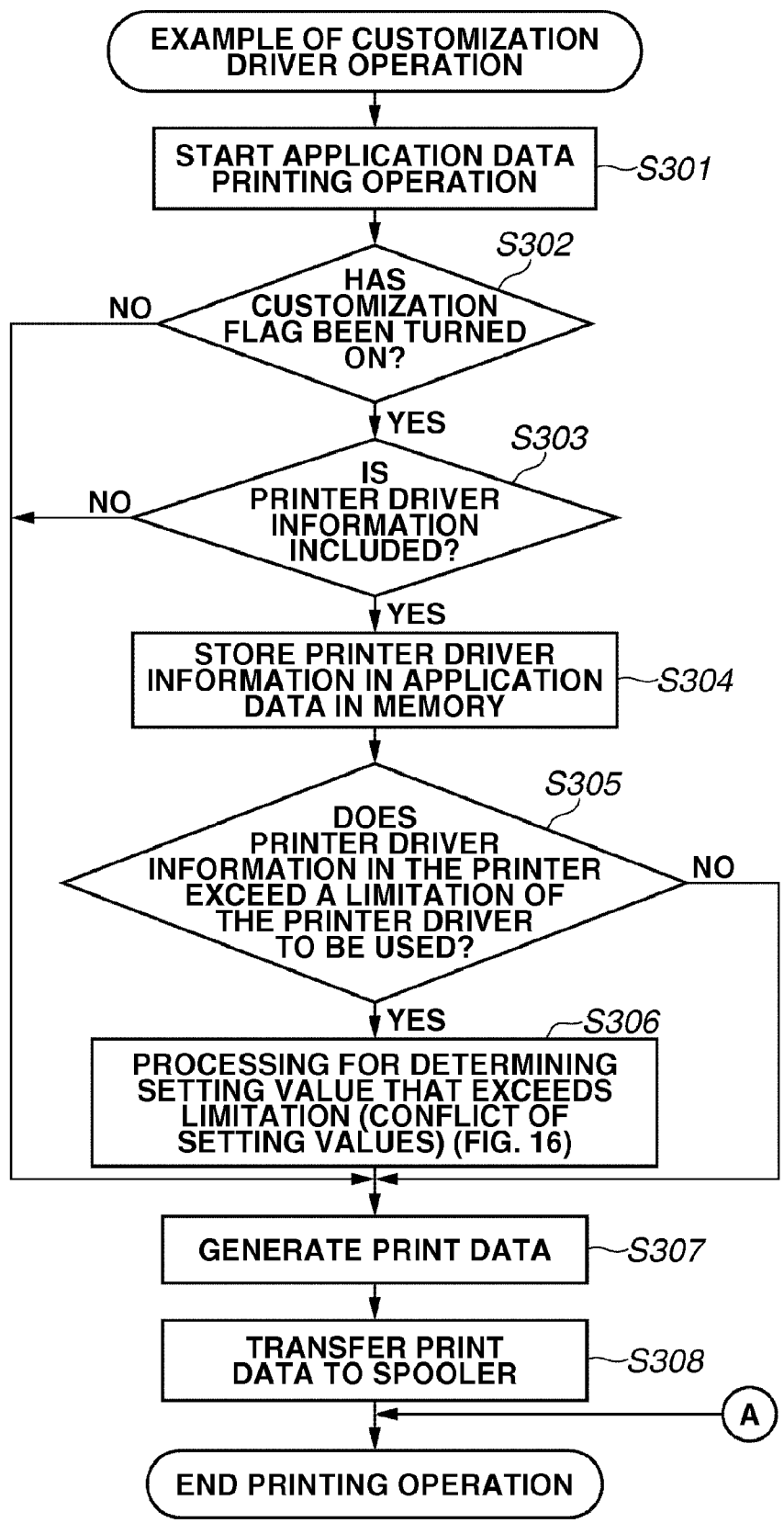
FIG. 15 is a flowchart illustrating one example of a printing operation performed by the customized printer driver according to a second exemplary embodiment of the present invention.
Figure 16:
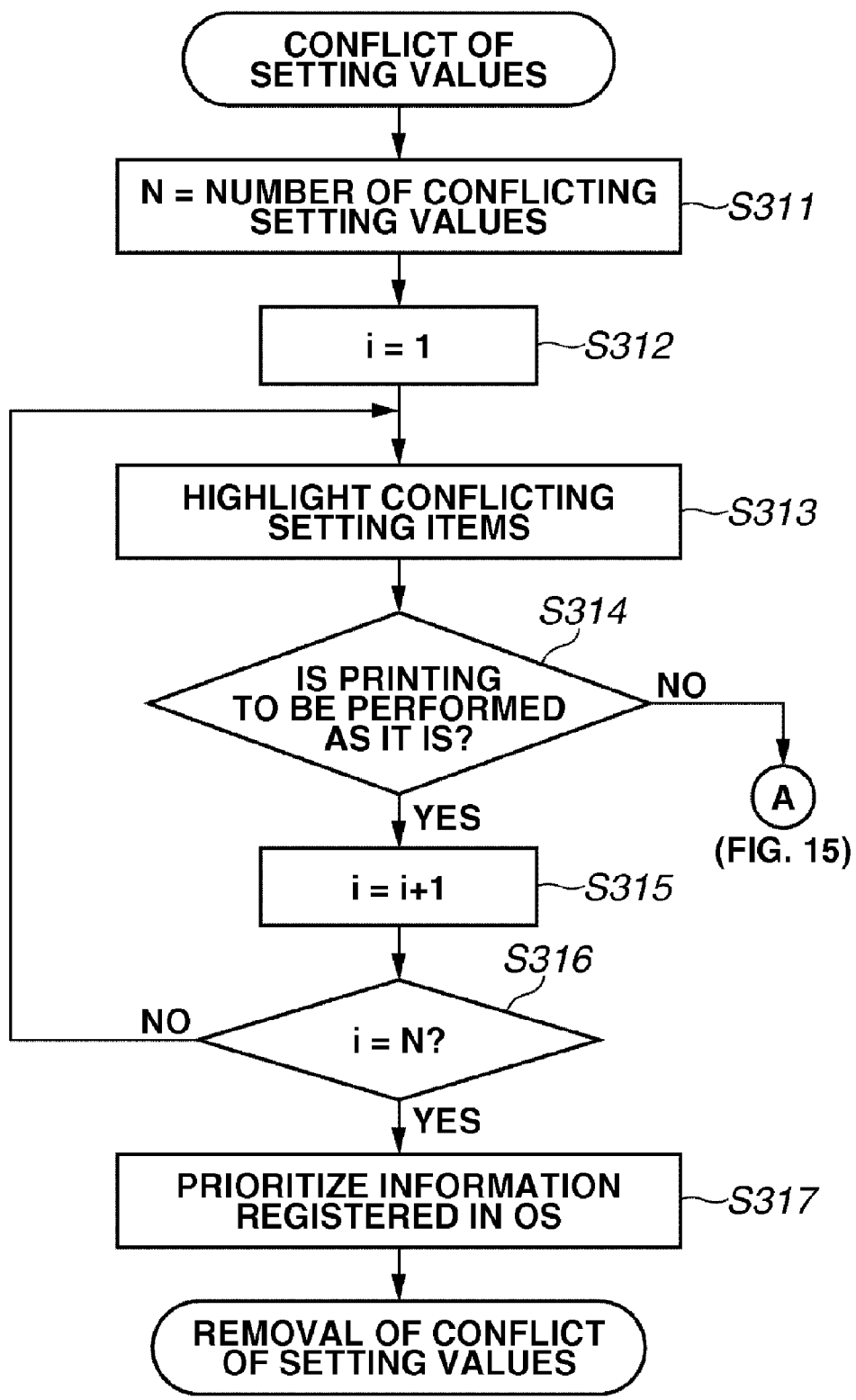
FIG. 16 is a flowchart illustrating one example of processing for determining setting values exceeding a limit determined in step S306 of FIG. 15.
Figure 17:
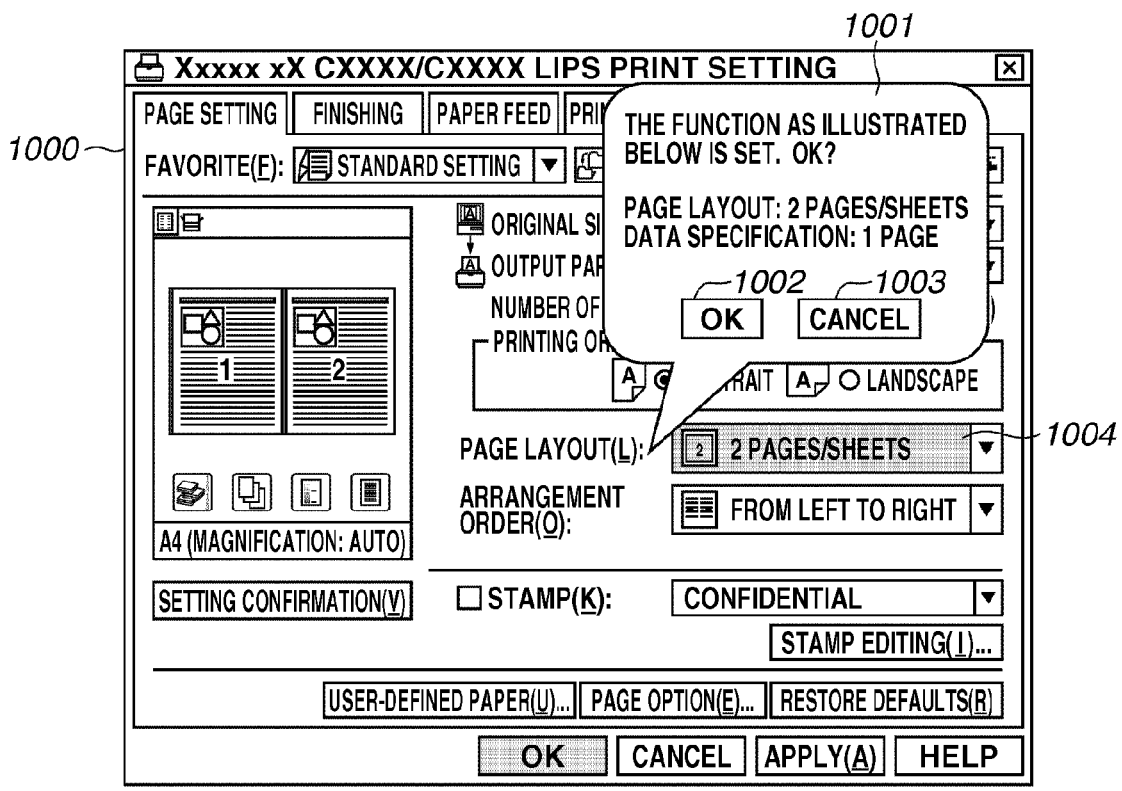
FIG. 17 is a diagram illustrating one example of a screen for displaying the setting values which are limiting and conflicting with each other, to receive selection by a user.

According to a second exemplary embodiment of the present invention, when the setting exceeding a range that is limited by the limitation information 64 of the printer driver is present in the printer driver information 61 held within the application data, the setting is notified to the user to allow the user to select the following processing. With reference to FIGS. 15 to 17, the printing operation by the customized printer driver according to the second exemplary embodiment will be described below.

FIG. 15 is a flow chart illustrating one example of the printing operation performed by the customized printer driver according to the second exemplary embodiment. The processing of the flowchart corresponds to the function that can be realized by the execution in which the CPU 201 of the host computer 100 loads a program stored in the external memory 211 into the RAM 202. Since steps S301 to S305, S307, and S308 are the same as steps S201 to S205, S207, and S208, the descriptions thereof are omitted in FIG. 12, and only step S306 will be described here.

Step S306 describes processing when the setting exceeding the range limited by the limitation information 64 of the printer driver exists in the printer driver information 61 within the application data (processing performed when the setting value conflicts with the limitation).

In step S306, the CPU 201 of the host computer 100 displays a message telling that the setting exceeds the customized limit when the setting exceeds the above-described customized limit, or displays the printer driver screen to allow the user to select the setting again. FIG. 16 illustrates the details of the processing (processing for determining the setting value exceeding the limit) in step S306.

FIG. 16 is a flowchart illustrating one example of processing operation for determining setting values exceeding the limit illustrated in step S306 of FIG. 15. The processing of the flowchart corresponds to the function that can be realized by the execution in which the CPU 201 of the host computer 100 loads the program stored in the external memory 211 into the RAM 202.

In step S311, the CPU 201 of the host computer 100 sets a number of the setting values conflicting with the limit (exceeding the limit) to a variable "N" held in the RAM 202. At this point, the setting values conflicting with the limit are arranged, for example, in order based on function identification data (ID) administrated in the printer driver.

Next, in step S312, the CPU 201 of the host computer 100 initializes a variable "i" held in the RAM 202 to "1".

Next, in step S313, the CPU 201 of the host computer 100 displays the setting value ("i" th) conflicting with the limit as illustrated by 1000, 1001 in FIG. 17 to receive selection by the user in step S313. More specifically, in a host computer 1000 of the printer driver, the CPU 201 of the host computer 100 highlights the setting conflicting with the limitation as illustrated by 1004, further, a message 1001 for illustrating a reason of conflicting with the limitation and a method for avoiding the conflict are displayed. And either one of a primary selection for prioritizing the limitation information 64 or a second selection for stopping the printing processing itself is received.

FIG. 17 is a diagram illustrating one example of a screen for displaying the setting values conflicting with the limitations to receive the selection by the user. When it is detected that a cancel button 1003 (FIG. 17) is clicked (selected) (the second selection), the CPU 201 of the host computer 100 ends the printing operation itself without change (NO at step S314).

On the other hand, when it is detected that an OK button 1002 (FIG. 17) is clicked (selected) (the primary selection), the CPU 201 of the host computer 100 advances the processing to step S315 (YES at step S314). In step S315, the CPU 201 of the host computer 100 increments the variable "i" to "1" and advances the processing to step S316.

Next, in step S316, the CPU 201 of the host computer 100 determines whether the variable "i" has become equal to a variable "N" (i=N). When it is determined that the variable "i" is still not equal to the variable "N", the processing gets back to step S313. On the other hand, in step S316, when it is determined that the variable "i" has become equal to the variable "N", the CPU 201 of the host computer 100 advances the processing to step S317.

In step S317, the CPU 201 of the host computer 100 prioritizes the information registered in the OS (the same as step S206 as illustrated in FIG. 12). More specifically, the setting value in the printer driver information 61 that exceeds the range having the limit indicated by the limitation information 64 is not employed, but the setting value of the setting information 63 of the printer driver is employed.

On the other hand, if the setting value does not exceed the range having the limit indicated by the limitation information 64, the value is employed. More specifically, the CPU 201 of the host computer 100 generates the printer driver information 66 by reflecting the setting value of the printer driver information 61 on the setting information 63 of the printer driver within the range having the limit indicated by the limitation information 64.

Upon ending the processing in step S317, the CPU 201 of the host computer 100 ends the processing of the flowchart of FIG. 16 and gets the processing back to the flowchart of FIG. 15. According to the present exemplary embodiment, as illustrated in FIG. 17, the setting values conflicting with the limitation are individually displayed. However, the setting values conflicting with the limitation may be collectively displayed to allow the user to select the OK button 1002 or the cancel button 1003.

As described above, even when the application data holding the printer driver information is printed using the customized printer driver, the application data can be printed according to the setting values (limit) of the customized printer driver. In this case, with recognition performed by the user, the application data can be printed reflecting the printer driver information in the application data within the range having the customized limit, thereby avoiding printing with the setting that the user does not intend to use.

When the customized printer driver is used for printing the application data 60, the printer driver information 61 is held in the application data 60, and the user performs the above-described primary selection, the printer driver information 61 may be ignored and the processing for printing the application data based on the setting information 63 of the printer driver may be executed.

With this arrangement, even when the application data holding the printer driver information is printed using the customized printer driver, with recognition performed by the user, the application data can be printed according to the setting values (limit) of the customized printer driver, thereby avoiding printing with the setting that the user does not intend to use.

Structure and items of various types of data as described above are not limited to the present exemplary embodiment, and various structures and items can be employed depending on a usage and purpose. The present invention can be realized as a system, an apparatus, a method, a program and a computer-readable storage medium. More specifically, the present invention may be applied to a system including a plurality of devices, or an apparatus configure of a single device.

The present exemplary embodiment describes one example in which the printer driver can be identified to be the customized printer driver by using the customization flag. However, the customization may not be used if the printer driver can be identified to be the customized printer driver.

For example, the printer driver to be installed may be identified to be the customized printer driver when at the time of installation, limitation information 802 is stored in the setting information file.

Further, the corresponding printer driver may be identified to be the customized printer driver when after the installation, the limitation information in the OS is already registered. More specifically, at any stages, the printer driver may be identified to be the customized printer driver.

According to the exemplary embodiment of the present invention, even when the application data holding the printer driver information is printed using the printer driver customized by the customization tool, the application data can be printed according to the setting value (within the rage having the limit) of the customized printer driver while reflecting the printer driver information in the application data.

FIG. 18 is a diagram illustrating a memory map in a computer-readable storage medium (recording medium) for storing various data processing programs that can be read by an information processing apparatus according to the exemplary embodiment of the present invention.

Information for administrating program groups to be stored in the computer-readable storage medium, for example, version information and an editor (not illustrated) can be stored, and also information depending on the OS at a program read-out side, for example, an icon for identifying a program can be stored.

Further, data depending on various programs is also administrated by the above-described directory. Further, the programs for installing various programs into the computer and the programs for decompressing the compressed program can be also stored.

The functions as illustrated in FIGS. 9, 10, 11, 12, 15, and 16 according to the present exemplary embodiment may be executed by the host computer using the program installed from the external. In that case, the present invention can also be applied when the information group including the program is supplied by the computer-readable storage medium such as the CD-ROM, a flush memory and the FD, or an external computer-readable storage medium via the network.

As described above, the computer-readable storage medium storing the program code of software that realizes the above-described function of the exemplary embodiment is supplied to the system or the apparatus. The computer (or CPU or micro processing unit (MPU)) of the system or the apparatus reads out and executes the program code stored in the computer-readable storage medium so that the present invention can be realized.

In this case, the program code itself read out from the computer-readable storage medium realizes a new function of the present invention, and the computer-readable storage medium storing the program code constitutes the present invention. Accordingly, as long as the function of the program is included, any form of the program such as a program executed by an object code and an interpreter and script data supplied for the OS can be employed.

As the computer-readable storage medium for supplying the program, for example, a floppy disk, hard disk, optical disk, optical magnetic disk, magneto-optic disk (MO), CD-ROM, CD-recordable (CD-R), CD-rewritable (CD-RW), magnetic tape, non-volatile memory card, ROM, digital versatile disk (DVD) can be used. In this case, since the program code itself read out form the computer-readable storage medium realizes the function of the exemplary embodiment as described above, the computer-readable storage medium storing the program code constitutes the present invention.

In addition, as a method for supplying the program, by connecting to the web site of the Inter Net using the browser of the client computer and downloading the program from the web site to the computer-readable storage medium such as the hard disk, the program itself of the exemplary embodiment of the present invention can be supplied. Further, the program can be also supplied by downloading a compressed file including an automatic installation function from the web site to the computer-readable storage medium such as the hard disk.

Furthermore, the program code forming the program according to the exemplary embodiment of the present invention can be divided into a plurality of files, and each of the files can be downloaded from the different web sites to realize the present invention. More specifically, the present invention includes the World Wide Web (WWW) server and the File Transfer Protocol (FTP) server that allow a plurality of users to download the program file for realizing the function processing according to the exemplary embodiment of the present invention by the computer.

Further, the program according to the exemplary embodiment of the present invention is encrypted and stored in the computer-readable storage medium such as CD-ROM to be distributed to the user. Further, the user who satisfies a predetermined condition is allowed to download key information for the decryption from the web site. Further, the decrypted program is executed using the key information and installed in the computer so that the present invention can be realized.

Further, in addition to executing the program code read out by the computer according to the above-described exemplary embodiment can be executed and, the present invention can include the following configurations. For example, based on the instruction by the program code, the OS running on the computer performs a part or all of the actual processing and the function of the exemplary embodiment as described above can be realized by the processing, which is also included in the present invention.

Furthermore, the program code read out from the computer-readable storage medium is written into a memory provided in a function extension board inserted into the computer or a function extension unit connected to the computer. Based on the instruction by the program code written into the memory, the CPU provided in the function extension board or the function extension unit performs a part or all of the actual processing and the function of the exemplary embodiment as described above is realized, which is also included in the present invention.

Moreover, the present invention may be applied to the system formed of a plurality of devices or the apparatus formed of one device. Further, the present invention can be applied to a case where the present invention can be realized by supplying the program to the system or the apparatus. In this case, the computer-readable storage medium storing the program described by the software for realizing the present invention is read out to the system or the apparatus so that the system or the apparatus can realize the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-057665 filed Mar. 7, 2008, which is hereby incorporated by reference herein in its entirety.

What is claimed is:

1. An information processing apparatus that installs a printer driver therein, comprising:
   a primary determination unit configured to determine, when printing processing is performed, whether a printer driver to be used for the printing processing is a customized printer driver having limitation information set for setting information that is set for the printer driver;
   a second determination unit configured to determine whether data on which the printing processing is to be performed holds the setting information; and
   a control unit configured to execute the printing processing on application data using the printer driver by reflecting the setting information held in the data on which the printing processing is performed, on the setting information set in the printer driver within a range of a limit indicated by the limitation information, when the primary determination unit determines that the printer driver is the customized printer driver and the second determination unit determines that the data on which the printing processing is performed holds the setting information.

2. The information processing apparatus according to claim 1, further comprising:
   a display unit configured to display, from among the setting information held in the data on which the printing processing is performed, the setting information exceeding the range of the limitation information; and
   a selection unit configured to make a primary selection for prioritizing the limitation information or a second selection for stopping the printing processing on the setting information exceeding the range of the limitation information,
   wherein, when the selection unit makes the primary selection, the control unit executes the printing processing without reflecting the setting exceeding the range of the limit indicated by the limitation information of the setting information held in the data on which the printing processing is performed, and when the selection unit makes the second selection, the control unit stops the printing processing.

3. An information processing apparatus that installs a printer driver therein, comprising:
   a primary determination unit configured to, when printing processing is performed, determine whether a printer driver to be used for the printing processing is a customized printer driver having limitation information set for setting information that is set for the printer driver;
   a second determination unit configured to determine whether data on which the printing processing is performed holds the setting information; and
   a control unit configured to execute the printing processing on the application data by using the printer driver based on the setting information set in the printer driver, when the primary determination unit determines that the printer driver is the customized printer driver and the second determination unit determines that the data on which the printing processing is performed holds the setting information.

4. The information processing apparatus according to claim 3, further comprising:
   a display unit configured to display, from among the setting information held in the data on which the printing processing is performed, the setting information exceeding the range of the limitation information; and
   a selection unit configured to make a primary selection for prioritizing the limitation information or a second selection for stopping the printing processing of the setting information when the setting information exceeds the range of the limitation information,
   wherein, when the selection unit makes the primary selection, the control unit executes the printing processing based on the setting information set in the printer driver, and when the selection unit makes the second selection, the control unit stops the printing processing.

5. A method for controlling an information processing apparatus that installs a printer driver therein, comprising:
   determining, when printing processing is performed, whether the printer driver to be used for the printing processing is a customized driver having limitation information set for setting information that is set in the printer driver;
   determining whether data on which the printing processing is to be performed holds the setting information; and
   executing the printing processing on application data using the printer driver by reflecting the setting information held in the data on which the printing processing is performed to the setting information set, on the printer driver within a range of a limit indicated by the limitation information, when it is determined that the printer driver is the customized printer driver and it is determined that the data on which the printing processing is performed holds the setting information.

6. The method according to claim 5 further comprising:
   displaying, from among the setting information held in the data on which the printing processing is performed, the setting information exceeding the range of the limitation information; and
   making a primary selection for prioritizing the limitation information or a second selection for stopping the printing processing on the setting information exceeding the range of the limitation information,
   wherein, when the primary selection is made, the printing processing is executed without reflecting the setting exceeding the range of the limit indicated by the limitation information of the setting information held in the data on which the printing processing is performed, and when the second selection is made, the printing processing is stopped.

7. A method for controlling an information processing apparatus that installs a printer driver therein, comprising:
   determining, when printing processing is performed, whether the printer driver to be used for the printing processing is a customized driver having limitation information set for setting information that is set in the printer driver;
   determining whether data on which the printing processing is performed holds the setting information; and executing the printing processing on application data by using the printer driver based on the setting information set in the printer driver, when it is determined that the printer driver is the customized printer driver and it is determined that the data on which the printing processing is performed holds the setting information.

8. The method according to claim 7 further comprising:

displaying, from among the setting information held in the data on which the printing processing is performed, the setting information exceeding the range of the limitation information; and making a primary selection for prioritizing the limitation information or a second selection for stopping the printing processing on the setting information when the setting information exceeds the range of the limitation information, wherein, when the primary selection is made, the printing processing is executed based on the setting information set in the printer driver, and when the second selection is made, the printing processing is stopped.

9. A non-transitory computer-readable storage medium that stores a control program for executing a method, the method comprising:

determining, when printing processing is performed, whether the printer driver to be used for the printing processing is a customized driver having limitation information set for setting information that is set in the printer driver;

determining whether data on which the printing processing is performed holds the setting information; and executing the printing processing on application data using the printer driver by reflecting the setting information held in the data on which the printing processing is performed, on the setting information set in the printer driver within a range of a limit indicated by the limitation information, when it is determined that the printer driver is the customized printer driver and it is determined that the data on which the printing processing is performed holds the setting information.

10. A non-transitory computer-readable storage medium that stores a control program for executing a method, the method comprising:

determining, when printing processing is performed, whether the printer driver to be used for the printing processing is a customized driver having limitation information set for setting information that is set in the printer driver;

determining whether data on which the printing processing is performed holds the setting information; and executing the printing processing on application data using the printer driver based on the setting information set in the printer driver, when it is determined that the printer driver is the customized printer driver and data on which the printing processing is performed holds the setting information.

* * * * *